UNITED STATES PATENT OFFICE.

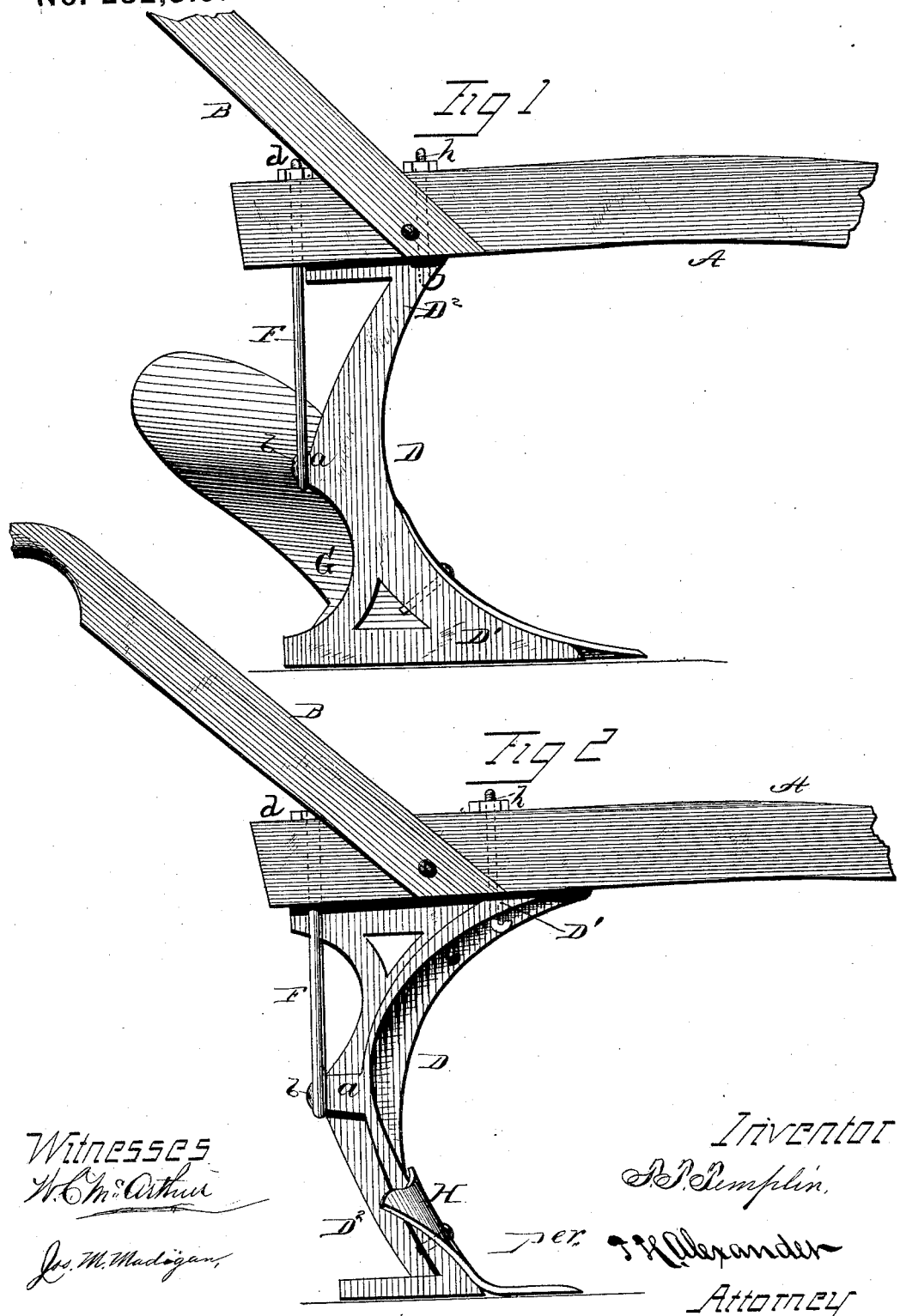

THOMAS T. TEMPLIN, OF MAYSVILLE, KENTUCKY.

PLOW.

SPECIFICATION forming part of Letters Patent No. 232,315, dated September 14, 1880.

Application filed April 22, 1880. (No model.)

*To all whom it may concern:*

Be it known that I, THOMAS T. TEMPLIN, of Maysville, in the county of Mason and State of Kentucky, have invented certain new and useful Improvements in Plows; and I do hereby declare that the following is a full, clear, and exact description thereof, reference being had to the accompanying drawings, and to the letters of reference marked thereon, which form part of this specification.

My invention relates to plows to be used for cultivating cotton; and it consists in a reversible shim having a double face for the attachment at one end of the mold-board and scraper, and at the other end of the bull-tongue, sweep, and shovel, as will be hereinafter more fully set forth.

In order to enable others skilled in the art to which my invention appertains to make and use the same, I will now proceed to describe its construction and operation, referring to the annexed drawings, in which—

Figure 1 is a side view of a plow embodying my invention, showing the mold-board in position. Fig. 2 is a similar view, showing the shovel in place.

A represents a plow-beam with handles B B and clevis, constructed in any suitable manner.

D represents the shim, formed at the back in the center with an enlargement, $a$, for the insertion from the rear of a screw, $b$, which connects the perforated head of a bolt, F, to the shim, the other end of said bolt passing upward through the beam and fastened by a nut, $d$.

The shim D is formed with a double face, one end, D′, being used for attaching a mold-board and scraper, G, and the other, $D^2$, for attaching a bull-tongue, sweep, and shovel, H. The shim may be reversed so that either end can be used, the other end being then against the under side of the beam and fastened by a bolt, $h$.

The only process necessary for changing the shim from one set of plows to the other—that is, for changing the shim from the position in which the bull-tongue, sweep, and shovel are attached to the position in which the mold-board and scraper may be attached—is to loosen the pivot-bolt F and take the forward bolt, $h$, out, then revolve the shim on the pivot-bolt, and then replace the forward bolt, $h$, and tighten the pivot-bolt.

I am aware that the state of the art shows it not to be new to employ a reversible plow-shim, and hence to this broad idea I lay no claim whatever; but What I do claim, and desire to secure by Letters Patent, is—

The within-described plow-shim, constructed to be reversible—that is to say, revolving upon a horizontal axis at its center—and adapted at one end to have a plow-share attached thereon, and to the opposite end a shovel or bull-tongue, and provided with rod F and bolt $b$, all arranged to operate as herein set forth.

In testimony that I claim the foregoing as my own I affix my signature in presence of two witnesses.

T. T. TEMPLIN.

Witnesses:
V. WORTHINGTON,
SPRIGG SHACKLEFORD.